Figure 1:
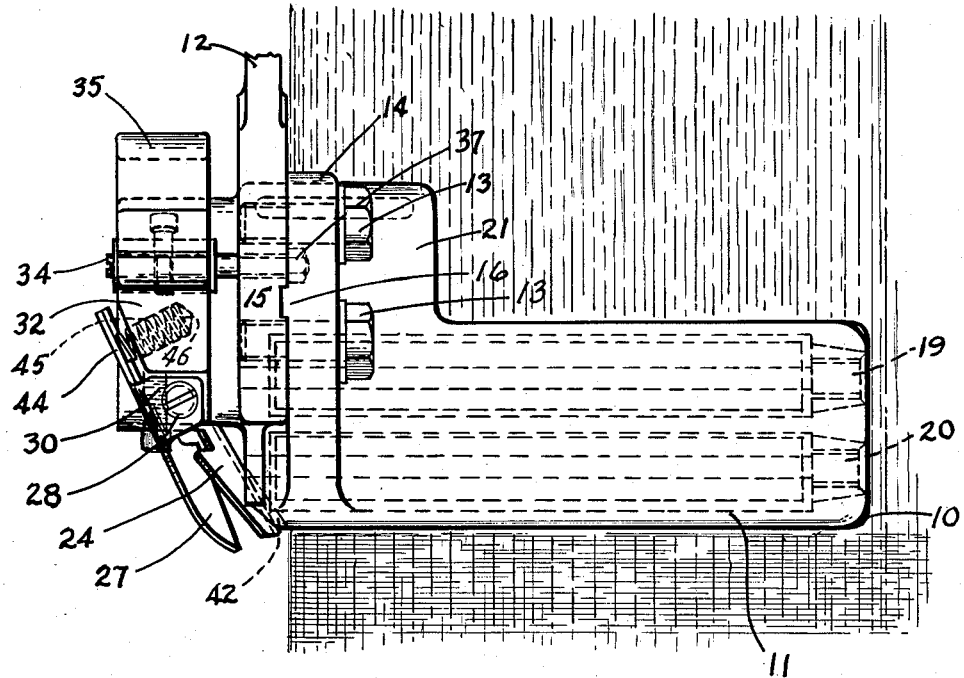

Jan. 19, 1960     J. P. CALLERY ET AL     2,921,612

TEMPLE THREAD CUTTER FOR LOOMS

Filed Sept. 27, 1957

INVENTORS:
JOHN P. CALLERY
BY FRANCIS F. LARSON

ATTORNEY

United States Patent Office 2,921,612
Patented Jan. 19, 1960

2,921,612

TEMPLE THREAD CUTTER FOR LOOMS

John P. Callery, Hopedale, and Francis F. Larson, Milford, Mass., assignors to Draper Corporation, Hopedale, Mass., a corporation of Maine Application September 27, 1957, Serial No. 686,637

3 Claims. (Cl. 139—266)

This invention pertains to temple thread cutters for looms and, more specifically, to improvements in the movable cutter blade of the cutting mechanism of such devices.

It is a general object of the invention to improve temple thread cutters of the type illustrated in United States Patent No. 2,718,242, granted September 20, 1955, and to provide a means which will maintain the movable cutter blade in contact laterally against the fixed cutter blade and insure proper frictional engagement therewith to maintain accurate cutting action of their cooperating cutting edges at all times that they are brought into coacting relationship to cut the filling.

Figure 2:
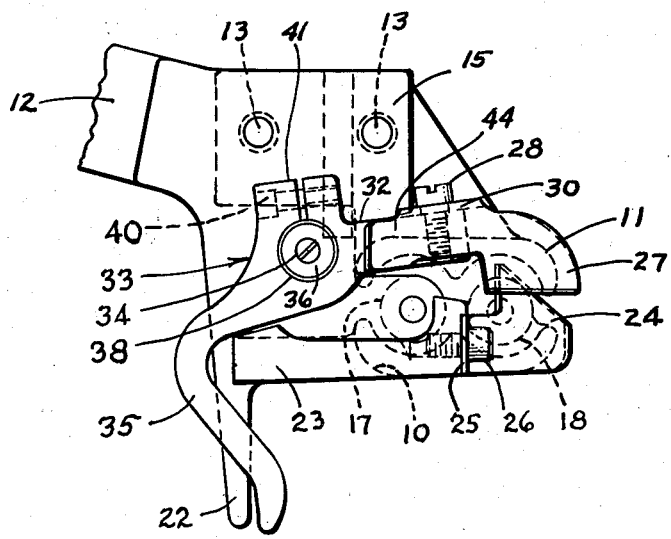

The invention will be described in greater detail by reference to one particular embodiment thereof as illustrated in the accompanying figures of the drawing wherein:

Fig. 1 is a plan view of a temple to which the invention has been applied and showing the temple mounted on the usual mounting bracket positioned above the fabric; and Fig. 2 is an end view of the temple and cutter means illustrated in Fig. 1.

Now referring to Figs. 1 and 2, the invention will be described with respect to its application to a temple of the type adapted to be mounted on a reciprocating arm held in bearing means, such as that illustrated in United States Patent No. 2,123,726. These temples are well known devices and the details of the mounting structures thereof need not be described further here.

As illustrated in the drawing, the temple has a pod structure which is comprised of a lower casing member 10 and an upper casing member 11. Such temples are mounted at the end of a reciprocatory arm 12 which is preferably a part of the lower casing or pod member 10, the top pod member 11 being attached thereto by means of suitable screws 13 passing through a flange 14 and being threaded into a second flange 15 which is in fact a part of the entire casting and arm structure, the alignment of the parts being maintained by a tongue and groove 16. Any suitable temple rollers may be employed, such as those shown at 17 and 18 which are rotatable upon spindles 19 and 20 retained and mounted in a conventional manner in the lower pod member 10. The lower pod member 10 is suitably flanged at its ends and appropriately drilled to support the spindles 19 and 20 and thus the temple rollers 17 and 18.

The lower casing member 10 has projecting rearwardly and downwardly therefrom a means by which it is contacted at each beat of the lay thereby to move the temple against a spring tensioning means so that undesired contact with the reed is avoided. This means comprises a rib 21, as shown in Fig. 1, and a downwardly projecting lug 22, see Fig. 2. The pod structure also extends to the side in a form of shelf 23 upon which is mounted the relatively fixed cutter member. This fixed cutter member comprises a blade 24 and a laterally or angularly directed extension 25 which is secured to the faced and shouldered forward part of the shelf 23 by a suitable screw 26, or other satisfactory attaching means.

The movable blade 27 is attached by a similar screw 28 passing through an opening, preferably in the form of a slot in an angularly directed holding bracket 30, these parts being similarly attached to the rearward end 32 of a lever generally indicated by numeral 33. This lever 33 extends to the opposite side of a pivot pin 34 to depend downwardly at 35 and form an actuating arm member to be contacted by some reciprocatory part of the loom such as the lay or an extension therefrom.

The cutter mounting bracket 30 is actually so devised as to bear within a shouldered receiving recess which prevents any appreciable turning movement of the cutter blade once the parts have been securely clamped in position. As illustrated in Fig. 1, this blade as well as the fixed blade 24 are so angularly disposed with respect to the passage of material through the temple that the cutting action may be adjusted to take place very close to the edge of the fabric being woven. In actual practice the edge is guided by an abutment in line with the inner surface of the flange 15 so that actually the cutting action takes place relatively close to the selvage.

Mounting of arm 33 on pivot pin 34 is resiliently effected through an elastic torsion bushing 36 similar to that of United States Patent No. 2,635,647. This bushing is firmly bonded or otherwise fixed to the outer end of pivot pin 34 which is threaded at its inner end for reception within a suitable tapped hole in the flange 15 as illustrated in Fig. 1. The inner projecting end of this pin or stud is then locked by means of a lock nut 37 the outer projecting threaded end having a screwdriver slot therein (not shown) so that by means of a screwdriver suitable tensioning or preloading of the rubber bushing 36 may be effected thereby to bias the arm 33 and the movable blade to an extreme position, for example, the open position of Fig. 2. As before stated there are certain instances in which the cutter blade may operate from a closed position being opened only long enough to take the thread and then being closed for cutting purposes by means of the torsion bushing or other resilient means.

The bushing 36 preferably is bonded to an outer sleeve member 38 which is clamped within the lever 33 by means of a clamping screw 40 effective upon the split portion 41 of the central part of the lever thereby to lock the arm to the bushing. When screw 40 is loosened it is possible to move the arm relatively to the pin 34 and bushing sleeve member 38 and thereby to effect proper axial positioning thereof. Having the parts in proper axial position, setting of the torsional resistance is accomplished as above explained and the fact that the parts are then moved axially a slight amount as the threaded pin is rotated has little effect on the axial position and thus on the cutting pressure or shearing action between the blades.

The blades may be adjusted angularly through a slight extent and may be moved laterally to or from the selvage of the fabric since the screws 26 and 28 are preferably passed through elongated openings or slots provided for that purpose. The forward corner 42 of the lower pod member 10 is actually cut away or beveled off, as illustrated in Fig. 1 so as to provide for positioning the cutter blades more closely to the edge of the fabric.

Preferably, the blades are both adjustable to an extent, but adjustment of one only may suffice.

As illustrated in Fig. 1, the movable cutter blade 27 has integral therewith a rearwardly extending arm portion 44, and there is disposed behind this arm extension a helically coiled spring 45 which is seated in a cylindrical socket or bore 46 drilled in the side of the lever 33 directly facing the inner side face of the arm extension 44. The outer end portion of the spring 45 projects outwardly beyond the socket and has its outermost end convolution bearing against the inside face of the arm extension 44 whereby the expansive action of the spring applies pressure thereagainst to tend to rock the cutter blade 27 about the screw 28 to maintain the spread of the arm extension 44 and, as a consequence thereof, to press yieldingly the inface of the forward cutting portion of the movable cutter blade 27 laterally against that of the fixed cutter blade 24 to maintain effective cooperation between the cutting edges of the two cutter blades and insure accurate cutting action thereof when they coact along their length to sever any filling ends extending from the edge of the cloth and brought into the field of action of the cutting blades as the cloth passes through the temple.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the appended claims.

What is claimed is:

1. A temple thread cutter for use with a temple having upper and lower pod members between which fabric is guided, said pod members having means for limiting the lateral outward movement of the fabric selvage and extending support means for the cutter which comprises a relatively fixed cutter blade, a relatively movable cutter blade for cooperating therewith, means operatively mounting said blades on said extending support and beyond the means for limiting the lateral outward movement of the fabric selvage, means biasing one of said blades to one extreme position incidental to its cutting movement, means for pivoting said movable blade for lateral movement with respect to said fixed blade, and resilient means urging said movable blade about the pivoting means toward said fixed blade.

2. A temple thread cutter for use with a temple having upper and lower pod members between which fabric is guided, said pod members having means for limiting the lateral outward movement of the fabric selvage and extending support means for the cutter which comprises a relatively fixed cutter blade, a relatively movable cutter blade for cooperating therewith, means operatively mounting said blades on said extending support and beyond the means for limiting the lateral outward movement of the fabric selvage, means biasing one of said blades to one extreme position incidental to its cutting movement, means for pivoting said movable blade for lateral movement with respect to said fixed blade, said movable blade including an arm extension rearwardly of said pivoting means, and resilient means applied against said extension for urging said movable blade about the pivoting means toward said fixed blade.

3. A temple thread cutter for use with a temple having upper and lower pod members between which fabric is guided, said pod members having means for limiting the lateral outward movement of the fabric selvage and extending support means for the cutter which comprises, a relatively fixed cutter blade, a relatively movable cutter blade for cooperating therewith, means operatively mounting said blades on said extending support and beyond the means for limiting the lateral outward movement of the fabric selvage, means biasing one of said blades to one extreme position incidental to its cutting movement, means for pivoting said movable blade for lateral movement with respect to said fixed blade, said movable blade including an arm extension rearwardly of said pivoting means, and a helically coiled spring applied against said extension for urging said movable blade about the pivoting means toward said fixed blade.

References Cited in the file of this patent

UNITED STATES PATENTS

| | | |
|---|---|---|
| 1,251,893 | Juhl | Jan. 1, 1918 |
| 1,919,146 | Douglas | July 18, 1933 |
| 2,171,468 | Bladgett | Aug. 29, 1939 |
| 2,600,036 | Wertepny et al. | June 10, 1952 |
| 2,685,324 | Kramer | Aug. 3, 1954 |
| 2,718,242 | Nichols | Sept. 20, 1955 |